A. C. CLARK.
Milk-Cooler.
No. 222,666. Patented Dec. 16, 1879.
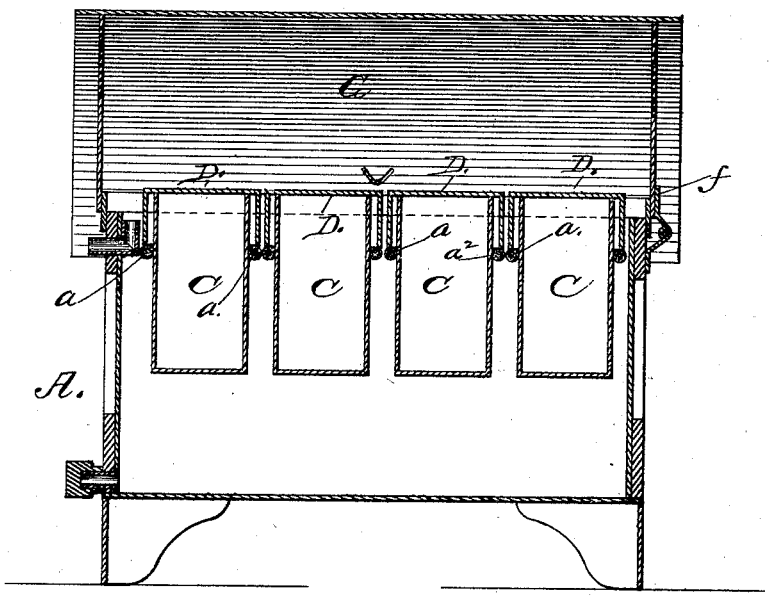
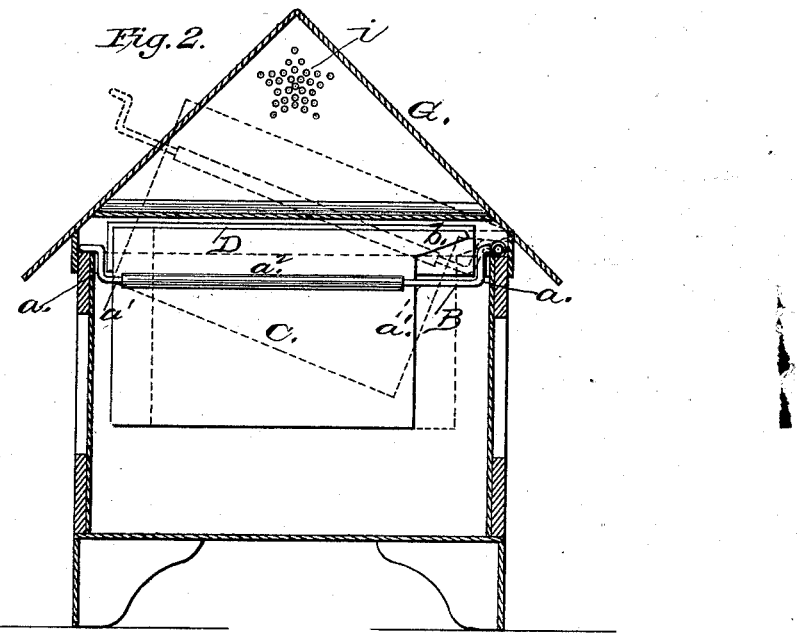
Witnesses
John A. Ellis.
Frank J. Masi.
Inventor
Amasa C. Clark
by C. W. Anderson
his Attorney

UNITED STATES PATENT OFFICE.

AMASA C. CLARK, OF MANCHESTER, IOWA.

IMPROVEMENT IN MILK-COOLERS.

Specification forming part of Letters Patent No. 222,666, dated December 16, 1879; application filed October 18, 1879.

*To all whom it may concern:*

Be it known that I, AMASA C. CLARK, of Manchester, in the county of Delaware and State of Iowa, have invented a new and valuable Improvement in Milk-Coolers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a longitudinal vertical section of my improved milk-cooler, and Fig. 2 is a transverse section thereof.

This invention has relation to improvements in milk-coolers; and the nature of the invention consists in the arrangement and co-operation of the various devices used, as will be hereinafter fully described and claimed.

In the annexed drawings, the letter A designates a rectangular tank of suitable construction and material, having adequate inducts in its end for the admission and discharge of water.

B indicates a number of metallic frames, hinged at one end to one edge of the top of the vat and bearing or resting upon its opposite edge at the other. These frames are bent down, as shown at $a$, at each end, so that the part $a'$ connecting these will be below the discharge end of the induct, and consequently under water. They vibrate freely upon their hinges in an arc of ninety degrees or more, and they sustain each a milk-pan, C, of less length than the horizontal parts $a$ of the said frames or bails, the said pans being supported thereon by means of sleeves $a^2$ attached to their sides, through which the parts $a'$ of the bails loosely pass.

The pans are made of a suitable metal, and are provided each at its end adjacent to the hinged end of the bail with a spout, $b$. They have sufficient endwise movement upon the bails to cause the spouts to project beyond the side of the tank, so that by vibrating said bails upon their hinges the pans are tilted and the cream run off into a suitable receptacle, after which the milk may be emptied and the pans cleaned and dried. These pans extend down into the tank with their bottom parts immersed in the water, and are closed by the removable flanged lids D, that fit loosely upon the said pans, and have their lower edges extending down the bends $a$ of the bails B, thus forming a water-seal and preventing access of air to the milk in the pans.

It will be observed that without the bends in the bails this result could not be obtained. No broad claim is, however, made to a water-seal, as such devices are common in gas-holders, garbage-vessels, and the like.

G indicates a double-inclined roof, the outer sheathing of which extends at the eaves and gables beyond the walls of the tank, and which is hinged at one end to the end wall thereof. In the ends of the gable near its peak are made numerous ventilating-holes, $i$. The roof is provided with a flange, $f$, fitting snugly over the upper edge of the tank, for the purpose of preventing all undue displacement.

What I claim as new, and desire to secure by Letters Patent, is—

1. The combination, with the tank A and the transverse vertically-vibrating bails B, hinged thereto at one end and resting thereon at the other, of the pans C, supported by said bails, sliding thereon endwise, and having each a projecting spout, $b$, substantially as specified.

2. The combination, with a tank, A, of the bails B, hinged to one edge of the same and resting on the other, and provided with the downward bends $a$, forming the depressed part $a'$ reaching under the water, and the independent pans C, supported by the bails and sliding endwise on said depressed parts, substantially as specified.

3. The combination, with the tank A, the vibrating bails B, having the depressed portions $a'$ under water, and the pans C, supported by said bails and sliding endwise thereon, of the lids D, fitting over the pans and spouts, and provided with a flange extending down the bends into the water, forming a seal, substantially as specified.

In testimony that I claim the above I have hereunto subscribed my name in the presence of two witnesses.

AMASA C. CLARK.

Witnesses:
HENRY W. RULE,
H. M. CONGAR.